United States Patent
Bialer et al.

(10) Patent No.: US 10,088,561 B2
(45) Date of Patent: Oct. 2, 2018

(54) DETECTION OF A DISTRIBUTED RADAR TARGET BASED ON AN AUXILIARY SENSOR

(71) Applicant: GM Global Technology Operations LLC, Detroit, MI (US)

(72) Inventors: Oded Bialer, Petah Tikva (IL); Igal Bilik, Rehovot (IL); Inna Stainvas Olshansky, Modiin (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 454 days.

(21) Appl. No.: 14/853,320

(22) Filed: Sep. 14, 2015

(65) Prior Publication Data

US 2016/0084954 A1    Mar. 24, 2016

Related U.S. Application Data

(60) Provisional application No. 62/052,721, filed on Sep. 19, 2014.

(51) Int. Cl.
    *G01S 13/86*    (2006.01)
    *G01S 7/41*    (2006.01)
    *G01S 13/93*    (2006.01)

(52) U.S. Cl.
    CPC .............. *G01S 13/86* (2013.01); *G01S 7/414* (2013.01); *G01S 13/865* (2013.01); *G01S 13/867* (2013.01); *G01S 13/931* (2013.01)

(58) Field of Classification Search
    CPC ...... G01S 13/86–13/867; G01S 13/931; G01S 2013/9314–2013/9396; G01S 7/41–7/418
    See application file for complete search history.

(56) References Cited

U.S. PATENT DOCUMENTS

| | | | |
|---|---|---|---|
| 4,860,216 A * | 8/1989 | Linsenmayer | G01S 7/412 342/159 |
| 7,050,652 B2 * | 5/2006 | Stanek | G01S 7/295 342/114 |
| 7,576,681 B2 * | 8/2009 | Chen | G06K 9/3241 342/175 |

(Continued)

FOREIGN PATENT DOCUMENTS

JP      2010175383 A      8/2010

OTHER PUBLICATIONS

Chinese Office Action for CN Application No. 201510924833.1, dated Jun. 16, 2017, pp. 1-15.

(Continued)

*Primary Examiner* — Matthew M Barker
(74) *Attorney, Agent, or Firm* — Cantor Colburn LLP

(57) ABSTRACT

A detection system to detect an object and a method of performing detection of an object are described. The system includes a radar system to transmit radiation and receive resulting reflections, the object being a distributed radar target reflecting multi-point reflections. The system also includes an auxiliary sensor to estimate one or more parameters of the object, and a processor to estimate a probability density function based on estimates of the one or more parameters of the object and the multi-point reflections and to detect the object based on the probability density function.

8 Claims, 3 Drawing Sheets

(56) References Cited

U.S. PATENT DOCUMENTS

| | | | |
|---|---|---|---|
| 7,689,321 B2 * | 3/2010 | Karlsson | G05D 1/0246 |
| | | | 318/103 |
| 7,742,620 B2 * | 6/2010 | Chen | G06K 9/3241 |
| | | | 382/103 |
| 8,781,688 B2 * | 7/2014 | Sandblom | A61L 35/18 |
| | | | 340/435 |
| 9,250,324 B2 * | 2/2016 | Zeng | G01S 13/87 |
| 9,557,415 B2 * | 1/2017 | Karam | G01S 17/89 |
| 2001/0031068 A1 | 10/2001 | Ohta et al. | |
| 2006/0152405 A1 | 7/2006 | Egri et al. | |
| 2007/0027597 A1 * | 2/2007 | Breuel | B60K 31/0008 |
| | | | 701/41 |
| 2014/0035775 A1 | 2/2014 | Zeng et al. | |
| 2014/0324339 A1 * | 10/2014 | Adam | G01S 13/726 |
| | | | 701/519 |
| 2015/0192668 A1 * | 7/2015 | Mckitterick | G01S 13/89 |
| | | | 702/159 |

OTHER PUBLICATIONS

Jin et al., "Detection of Distributed Targets Based on Suboptimal Matched Processing", Modern Radar, vol. 30, No. 2, Feb. 2008, pp. 1-3.

Ying et al., "Target detection algorithm for marine radar based on maximum likelihood estimate", Journal of Shangai Maritime University, vol. 33, No. 4, Dec. 2012, pp. 1-5.

Swindlehurst et al., "Maximum Likelihood Methods in Radar Array Signal Processing", Proceedings of IEEE, vol. 86, No. 2, Feb. 1998, pp. 421-441.

Tu et al., "Application of Maximum Likelihood Estimation to Radar Imaging", IEEE Transactions on Antennas and Propagation, vol. 45, No. 1, Jan. 1997, pp. 20-27.

* cited by examiner

DETECTION OF A DISTRIBUTED RADAR TARGET BASED ON AN AUXILIARY SENSOR

CROSS-REFERENCE TO RELATED APPLICATION

This application is a Non-Provisional of U.S. Provisional Patent Application Ser. No. 62/052,721 filed Sep. 19, 2014, the disclosure of which is incorporated by reference herein in its entirety.

FIELD OF THE INVENTION

The subject invention relates to detection of a distributed radar target using measurements from an auxiliary sensor.

BACKGROUND

Radio detection and ranging (radar) systems are used in a wide variety of arenas. For example, radar systems detect airplanes for air traffic control, marine radar systems detect landmarks or other ships, and ground-penetrating radar systems detect geological features. In automobiles, radar systems may be used to detect obstacles for a variety of purposes. Based on the distance from the radar system to the object being detected (the target), the target may be represented as a random cluster of multiple point scatters or reflection points. This is the case for obstacles detected by a radar system in an automobile, for example. Another automobile in front of the automobile equipped with the radar system would return point reflections based on transmitted pulses.

SUMMARY OF THE INVENTION

According to an exemplary embodiment, a detection system to detect an object includes a radar system configured to transmit radiation and receive resulting reflections, the object being a distributed radar target reflecting multi-point reflections; an auxiliary sensor configured to estimate one or more parameters of the object; and a processor configured to estimate a probability density function based on estimates of the one or more parameters of the object and the multi-point reflections and to detect the object based on the probability density function.

According to another embodiment, a method of performing detection of an object includes obtaining, using a radar system, multi-point reflections resulting from each transmission by the radar system; obtaining, using an auxiliary sensor, an estimate of one or more parameters of the object; estimating a probability density function based on the estimate of the one or more parameters of the object and the multi-point reflections; and detecting the object based on the probability density function.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
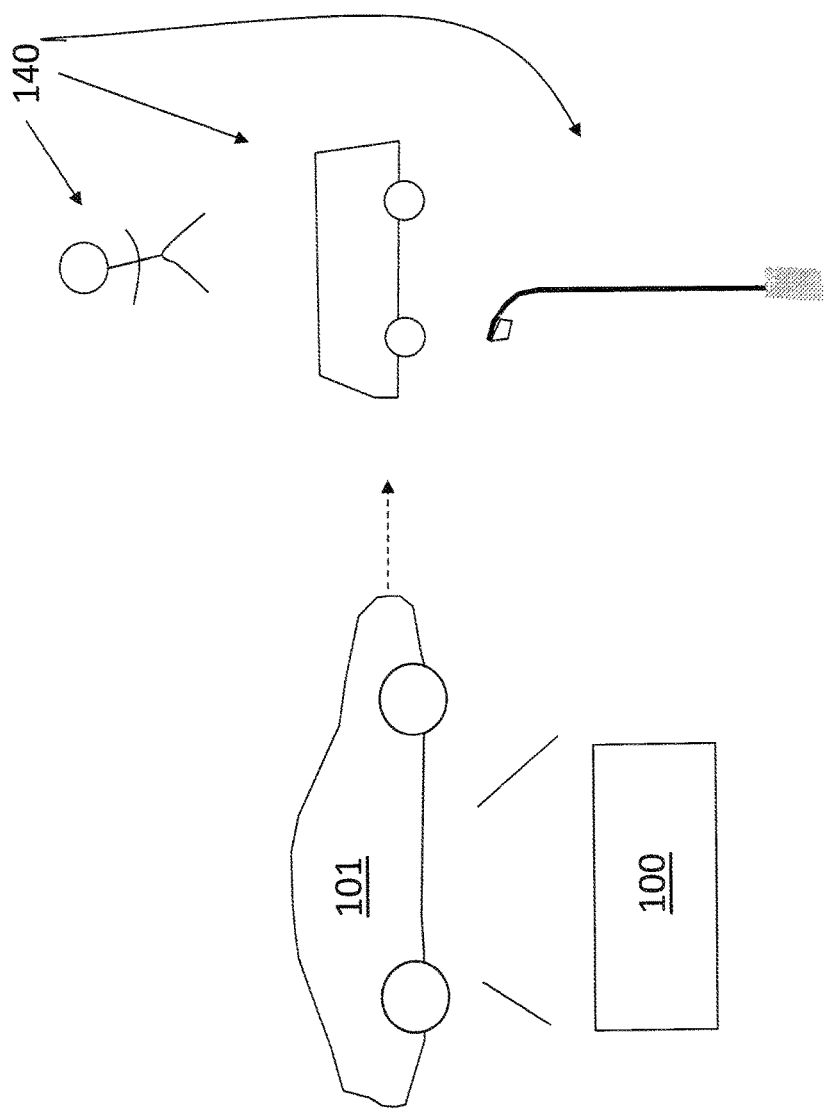
FIG. 1 illustrates an exemplary application of a detection system according to an embodiment of the invention.

The following description is merely exemplary in nature and is not intended to limit the present disclosure, its application or uses. It should be understood that throughout the drawings, corresponding reference numerals indicate like or corresponding parts and features.

As noted above, for some radar systems (e.g., those in automobiles) target objects are represented as a random cluster of multiple point reflectors. When a cluster of reflections belonging to the same object is estimated together rather than individually, detection (identification) of the object is made more accurate. However, not every reflection received by the radar system may be attributable to a single object. One or more reflections may result from other objects instead. Thus, the approach of estimating the cluster of reflections together benefits from knowledge of the probability density function (PDF) associated with the physical characteristics, location, and velocity of an object of the target object. The physical characteristics include, for example, size, orientation, material, and surface roughness. A consideration in using the PDF for object identification is that there may be a large set of possible objects and a large variation in the object characteristics and appearances. Also, different configurations of possible objects may yield similar received radar signals, thereby creating ambiguity in the target identification. A PDF estimated by taking into consideration all of the possibilities may be too general to have a relation to a specific object configuration and thereby aid in the identification of the object. Embodiments of the system and method discussed herein relate to using one or more auxiliary sensors (auxiliary to the radar system) to detect a distributed radar target (i.e., a radar target that is not a point reflector but, instead, is a multi-point reflector). Specifically, each auxiliary sensor improves the PDF estimation used to perform the object detection by further constraining the parameters used to estimate PDF.

Figure 2:
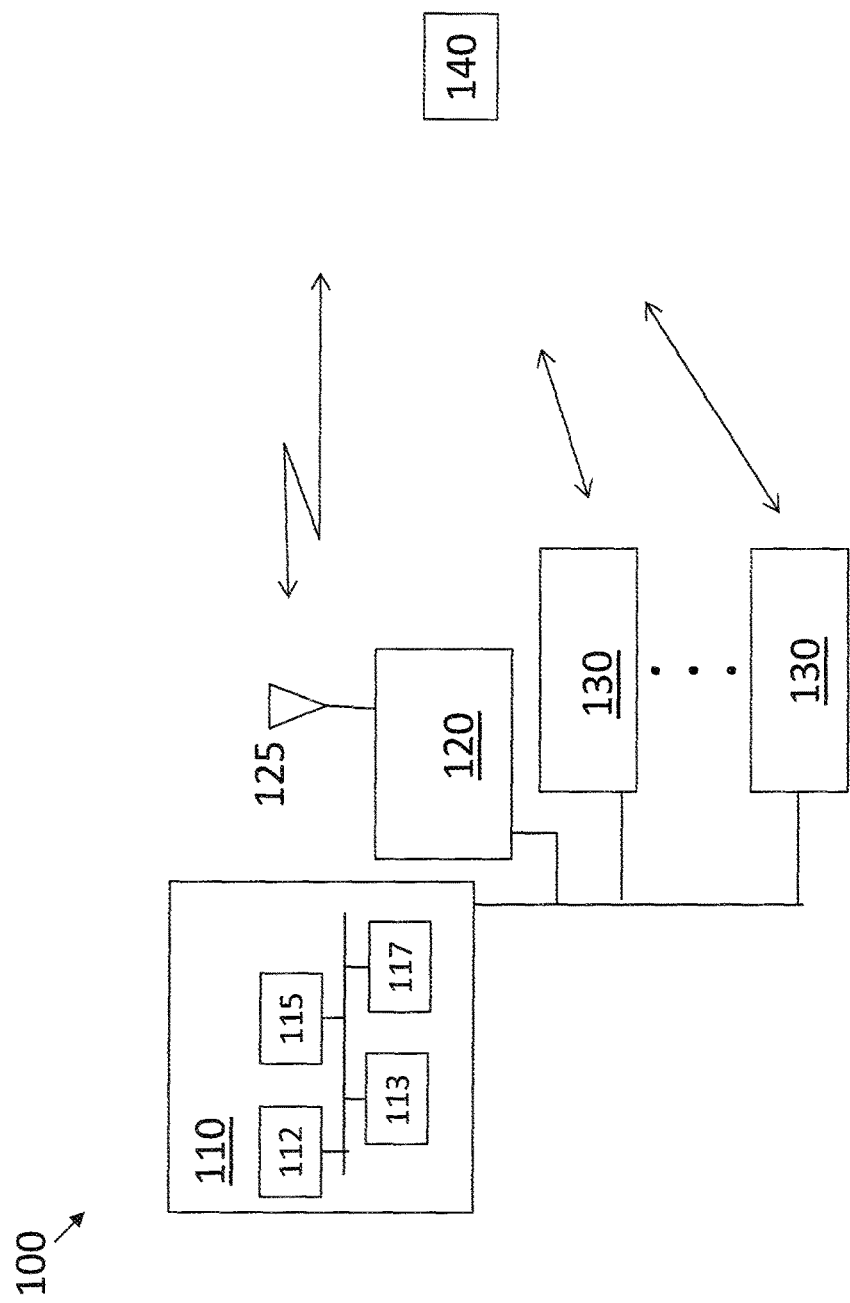
FIG. 2 details the detection system according to embodiments of the invention.

FIG. 1 illustrates an exemplary application of a detection system 100 according to an embodiment of the invention. The exemplary detection system 100 is shown in FIG. 1 as being part of an automobile 101. In alternate embodiments, the detection system 100 may be located elsewhere. In yet other embodiments, components of the detection system 100 may be distributed. For example, the sensors (radar system 120 and auxiliary systems 130) may transmit received signals to a remote processing system 110 (FIG. 2). Exemplary obstacles or objects 140 are shown, as well. The detection system 100 may provide information to other subsystems of the automobile 101. For example, a collision avoidance subsystem of the automobile 101 may use information received from the detection system 100 to make decisions about actions to take to avoid detected obstacles. As another example, a navigation subsystem of the automobile 101 may use information from the detection system 100 to identify landmarks along a path.

FIG. 2 details the detection system 100 according to embodiments of the invention. The detection system 100 includes the radar system 120 with an antenna 125 to transmit radiation and receive reflections. While a single antenna 125 is shown, the radar system 120 may have a separate antenna 125 for transmission and reception. One or more auxiliary systems 130 are also part of the detection system 100. Exemplary auxiliary systems 130 include a camera and light detection and ranging (lidar) system. The processing system 110 includes an input interface 112 that receives inputs from the radar system 120 and the one or more auxiliary systems 130 in addition to user inputs and other inputs. The processing system 110 also includes one or more memory devices 113 that store data and instructions used to control one or more processors 115 of the processing system 110 and an output interface 117. The output interface 117 may include audio or visual output or information sent to other subsystems of the automobile, for example. The processor 115 may be implemented as an application specific integrated circuit (ASIC), an electronic circuit, or a combinational logic circuit, for example.

The processor 115 performs a parameterized PDF estimation based on inputs from the radar system 120 and the one or more auxiliary systems 130. That is, based on parameters such as distance (location), size, shape, material, and texture, for example, provided by the one or more auxiliary systems 130, the processor 115 obtains an enhanced estimate of PDF of the detected object 140 from the reflections received by the radar system 120. The parameter information provided by the one or more auxiliary systems 130 constrains the PDF estimate further. The processor 115 may perform object detection using a maximum likelihood estimator, for example. With $\Omega$ representing a cluster of reflections associated with the same object (based on a probability that the reflections belong to the same object), $\Lambda$ representing object characteristics (e.g., size, orientation, material, surface roughness) obtained from the one or more auxiliary systems 130, and Y representing the point reflections received by the radar system 120, the maximum likelihood used for object detection is given by:

$$\hat{\Omega} = \arg\max_{\Omega} f(Y|\Omega,\Lambda) \qquad [\text{EQ. 1}]$$

The function may be, for example, a correlated Gaussian distribution.

Figure 3:
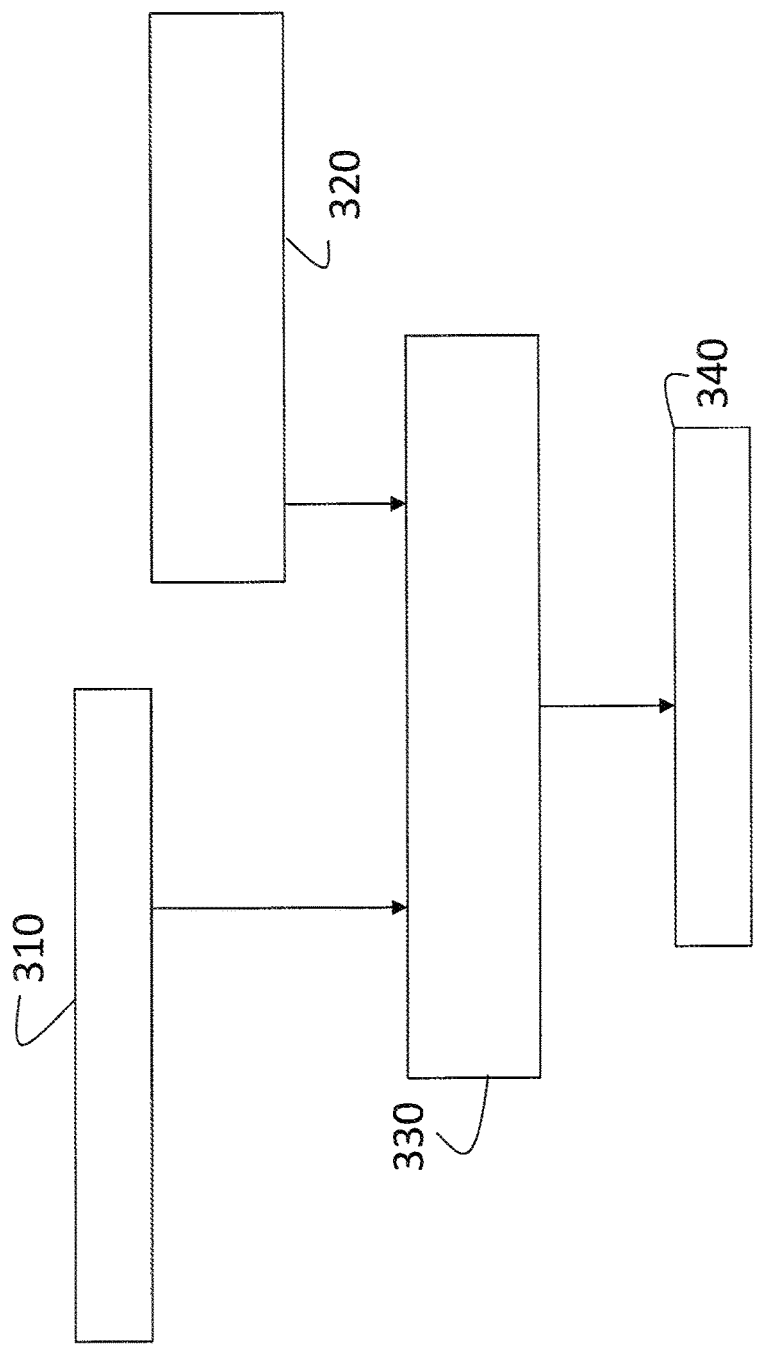
FIG. 3 is a process flow of a method of detecting a distributed radar target according to an embodiment of the invention.

FIG. 3 is a process flow of a method of detecting a distributed radar target (an object 140 that includes multiple point reflectors) according to an embodiment of the invention. At block 310, obtaining multiple point reflections is based on radar echoes received by the radar system 120. Obtaining parameter estimates based on one or more auxiliary systems 130, at block 320, may include using a camera or lidar, for example. At block 330, estimating the PDF associated with the object 140 (the radar target) includes using the auxiliary system 130 outputs to constrain the parameters in the parameterized PDF estimation performed by the processor 115. Performing object detection, at block 340, may include using a maximum likelihood estimation discussed with reference to EQ. 1 above.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A detection system to detect an object, comprising:
a radar system configured to transmit radiation and receive resulting reflections, the object being a distributed radar target reflecting multi-point reflections;
an auxiliary sensor configured to estimate one or more parameters of the object; and
a processor configured to identify the object by estimating a cluster of reflection points $\hat{\Omega}$ based on a maximum likelihood estimation given by:

$\hat{\Omega} = \arg\max_{\Omega} f(Y|\Omega,\Lambda)$, wherein $\Omega$ represents the cluster of reflection points, $\Lambda$ represents the one or more parameters of the object estimated by the auxiliary sensor, and Y represents the multi-point reflections obtained by the radar system.

2. The system according to claim 1, wherein the auxiliary sensor is one of a camera or a lidar.

3. The system according to claim 1, wherein at least two auxiliary sensors are configured to estimate two or more parameters of the object.

4. The system according to claim 1, wherein the one or more parameters of the object include at least one of location, size, shape, orientation, material, or texture.

5. A method of performing detection of an object, the method comprising:
emitting transmissions using a radar system,
obtaining, using the radar system, multi-point reflections resulting from each transmission by the radar system;
obtaining, using an auxiliary sensor, an estimate of one or more parameters of the object;
estimating a cluster of reflection points $\hat{\Omega}$ based on a maximum likelihood estimation given by:

$\hat{\Omega} = \arg\max_{\Omega} f(Y|\Omega,\Lambda)$, wherein $\Omega$ represents the cluster of reflection points, $\Lambda$ represents the one or more parameters of the object estimated by the auxiliary sensor, and Y represents the multi-point reflections obtained by the radar system; and
identifying the object based on the cluster of reflection points $\hat{\Omega}$.

6. The method according to claim 5, wherein the obtaining the estimate of the one or more parameters of the object includes using at least one of a camera or a lidar.

7. The method according to claim 5, wherein the obtaining the estimate of the one or more parameters of the object is based on at least two of the auxiliary sensors.

8. The method according to claim 5, wherein the obtaining the estimate of the one or more parameters of the object includes obtaining at least one of location, size, shape, orientation, material, or texture.

* * * * *